United States Patent [19]

Core

[11] Patent Number: 4,974,449

[45] Date of Patent: Dec. 4, 1990

[54] METHOD FOR BALANCING THE CRANKSHAFT IN AN UNEVEN DEGREE FIRING ENGINE

[76] Inventor: Steve Core, Rt. 1 Box 147-A, Stedman, N.C. 28391

[21] Appl. No.: 235,048

[22] Filed: Aug. 23, 1988

[51] Int. Cl.⁵ .............................................. G01M 1/24
[52] U.S. Cl. ......................................... 73/460; 73/468
[58] Field of Search ................. 73/460, 461, 462, 469, 73/471, 475, 487, 468

[56] References Cited

U.S. PATENT DOCUMENTS 2,014,838  9/1935  Edwards .............................. 73/487
4,446,732  5/1984  Schoenfeld ........................... 73/461

OTHER PUBLICATIONS

Heldt, P. M., *High Speed Combustion Engines*, 1944, pp. 41-61, 242-247, 272-277.
Carrier, Herb, "Buick's New V-6 Engine", *Motor Service*, Jan. 1962, pp. 56-59, 110-112.
Jorgensen, Eric, *Clymer Harley-Davidson Service*, 1981, p. 15.
Jones, Fred, "Super Vee Motorcycle Engine", *Hot Bike*, vol. 20, No. 5, Jun. 1988, pp. 58-61.

*Primary Examiner*—John Chapman
*Attorney, Agent, or Firm*—Rhodes, Coats & Bennett

[57] ABSTRACT

A method for designing and producing an internal combustion engine of the reciprocating type which allows for reducing the number of cylinders required for smooth operation of an engine of any size displacement. A new balancing procedure for dynamically balancing the crankshaft and reciprocating parts overcomes the vibration forces produced by the high moments of inertia inherent in reciprocating engines with a single plane crankshaft and large cylinder bores. The engine designed and assembled in accordance with this procedure may have fewer cylinders and moving parts than engines produced and assembled with balancing methods in current use, but with the same total volume of cylinder bore displacement.

1 Claim, 6 Drawing Sheets 4,974,449

METHOD FOR BALANCING THE CRANKSHAFT IN AN UNEVEN DEGREE FIRING ENGINE

FIELD OF THE INVENTION

The present invention relates generally to a method for producing a type of reciprocating engine having an uneven degree firing pattern, and more particularly to a method for balancing a crankshaft in such an engine.

BACKGROUND OF THE INVENTION

Since the oil crisis of the early 1970s, there have been an increasing demand for smaller, more fuel efficient cars. Automotive manufacturers in the United States have responded to this demand by introducing vehicles powered by four-cylinder engines of recent design. These new designs represent the considerable investment in design, development, and manufacturing facilities on the part of the automobile manufacturers and their suppliers. These increased costs can only be recovered by passing them on to the consumer.

The smaller vehicles must be designed with smaller engine compartments which cannot accommodate the six and eight-cylinder engines commonly produced by the United States auto industry during the last 40 years. The engine families developed for the smaller vehicles are often completely new designs which are inherently costly. In order to satisfy customer performance expectations, manufacturers have increased engine displacement, but with increased displacement, four-cylinder engines have harsh vibration characteristics. The current practice is to dampen these vibration characteristics with the addition of counter rotating, balancing shafts, but these shafts increase the weight of the engine, increase the cost of production, and consume some energy in their operation which greatly compromise the value of the four-cylinder design. The other alternative, a small displacement 60-degree V-6 engine, is an even more costly solution.

Under the current method for balancing engine crankshafts, the requirement is to first statically balance the crankshaft, without accounting for the weight of the piston and connecting rod assembly, prior to dynamically balancing the crankshaft thereby placing an upper limit of 2,000 cubic centimeters on the total displacement of four-cylinder engines. The economic inherent in producing a truly large displacement four or even two-cylinder engine has been regarded as impossible or impractical to achieve utilizing current balancing procedures.

SUMMARY AND OBJECTS OF THE INVENTION

After much research into the above-mentioned problem, the present method has been developed for designing and producing internal combustion, reciprocating engines with fewer cylinders, but with a total engine displacement equal to larger engines currently in use in the automotive industry. This is accomplished by increasing the bore and stroke dimensions and by eliminating a number of cylinders in an engine block, so that a two-cylinder engine may have equal displacement and horse power output of a four-cylinder engine. To compensate for the increased vibrational forces resulting from increasing the mass of the reciprocating parts and the uneven degree firing of the cylinders, a new method for dynamically balancing the crank shaft of the engine has been developed.

In view of the above, it is an object of the present invention to reduce the cost of the manufacture and assembly of internal combustion engines of the reciprocating type.

Another object of the present invention is to reduce the size and simplify weight of such engines by reducing the size of the engine block and auxiliary components (cylinder heads, intake, exhaust manifold, crankshaft).

Another object is to simplify the design of the engine by reducing the number of moving parts necessary, thereby reducing the cost of manufacture, assembly, and installation.

Another object of the present invention is to provide for a method of balancing the rotational and reciprocating forces acting on the crankshaft of the engine allowing it to run smoothly.

Still another object of the present invention is to increase the efficiency of internal combustion engines through a reduction in cylinder pumping losses made possible by eliminating a number of cylinders necessary for a given displacement.

Other objects and advantages of the present invention will become apparent and obvious from a study of the following description and the accompanying drawings which are merely illustrative of such invention.

DETAILED DESCRIPTION OF THE INVENTION

With further reference to the drawings, an example of an engine 10 is shown which was produced in accordance with the present invention. The construction of this engine is similar to that of the standard eight-cylinder, V-type engine in use today. Similarities between the two designs would permit manufacturers to utilize many standard components, materials, and machine tools already in use with current automotive industry produced engines.

Figure 1:
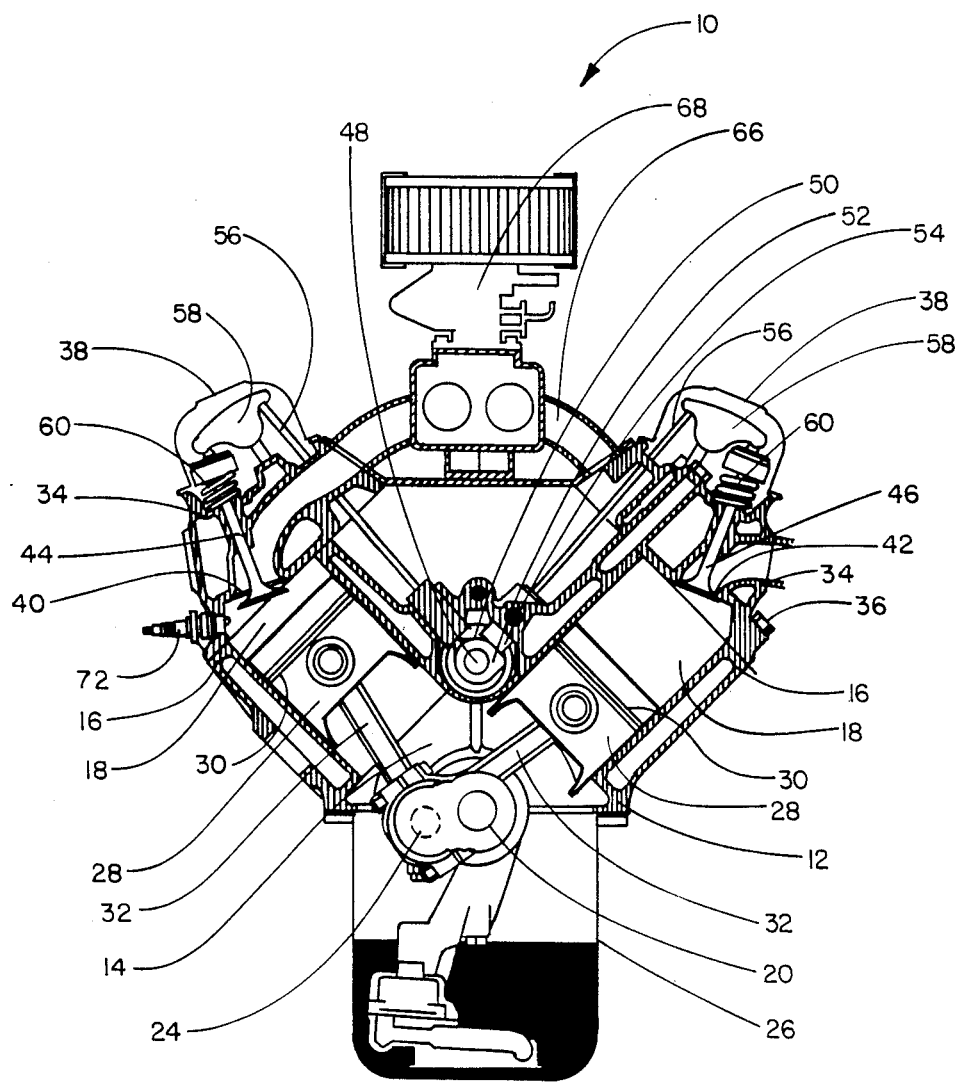
FIG. 1 is a cross sectional view of a V-type engine produced in accordance with the present invention.
Figure 2:
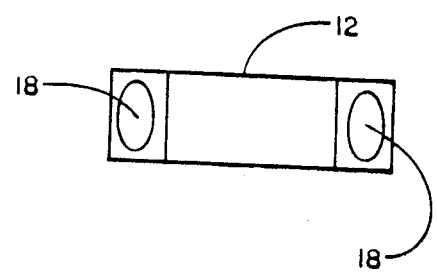
FIG. 2 is a top plan view thereof, with the cylinder head removed.

Referring now to FIG. 1, the V-type engine 10 includes an engine block 12 having a lower crank case 14 and two-cylinder banks 16 disposed at 90 degrees with respect to each other.

Each cylinder bank 16 includes a single cylinder 18. The design of the engine block 12 is substantially the same as larger V-type engine in present use. A crankshaft 20 including an integrally formed crankshaft sprocket and a single crank throw 24 mounted within crank case 14 in the normal manner of such engines. A reciprocating piston 28 is disposed within each cylinder 18 and connected to the crankshaft 20 by means of a connecting rod 32. In the present invention, the crankshaft includes a single crank throw 24 and journal to which the connecting rods 32 of each piston 28 are attached. This creates a simpler, stronger, and less costly crankshaft than one in which the journals for each piston connecting rod 32 are separate and offset. This single journal crankshaft 20 will result in an uneven degree firing order which would normally result in substantial vibration during operation. However, a new method for dynamically balancing the crankshaft 20 of the two cylinder engine eliminates this vibration and makes normal and smooth operation possible with large cylinder bores. This balancing method is discussed more fully in subsequent portions of this specification.

A pair of cylinder heads 34 are mounted on top of respective cylinder banks 16 by head bolts 36. The cylinder head 34 closes the upper end of the cylinders 18 and includes a plurality of machine openings. More particularly, the cylinder head 34 includes an intake valve opening 40 and an exhaust valve opening 42 communicating with each cylinder 18. An intake valve 44 and an exhaust valve 46 are mounted, respectively, within the intake valve opening 40 and exhaust valve opening 42 and are operated to open and close the same. The intake valve 44 and exhaust valve 46 are opened and closed by a camshaft 48.

Figure 3:
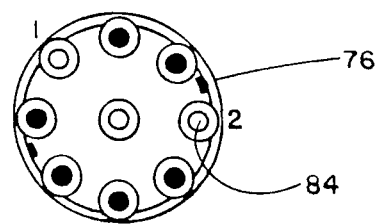
FIG. 3 is a side top plan view of a distributor used in connection with the engine.

The camshaft 48 is mounted within engine block 12 between the cylinder banks 16. The camshaft 48 includes a plurality of cams 50 having raised sections or lobes 52. The number of cams 50 on the camshaft 48 are, of course, dependent upon the number of intake and exhaust valves in the engine. The camshaft 48 of the present invention has only four cams 48 to operate two intake valves 40 and two exhaust valves 42. (FIG. 3)

Riding on each cam 50 is a cylindrical valve tappet 54. As the camshaft 48 rotates and the lobe 52 moves under the valve tappet 54, the valve tappet 54 is raised. The valve tappet 54 in turn engages a push rod 56 extending between the valve tappet 54 and a rocker arm 58 mounted on the cylinder head 34. The push rod 56 pushes the rocker arm 58 forwardly which engages the intake valve 44 or exhaust valve 46, as the case may be, so that the valve is raised off its seat and so that the valve opens. When the lobe 52 on the cam moves on around out of the way, the pressure of the valve spring 60 on the valve forces the valve to reseat. At the same time, the valve tappet 54 is forced downwardly so that it remains in contact with the cam 50.

It is appreciated that the intake and exhaust valves 44 and 46 must open and close in step with the movement of the piston 28. The opening and closing of the valves is controlled by the camshaft 48 as described above. The position of the piston 28 is related to the position of the crankshaft 20 since they are connected by connecting rod 32. Thus, the rotation of the crankshaft 20 and camshaft 48 must be synchronized for proper valve timing.

In order to accomplish proper valve timing, a camshaft gear is journaled about the front end of camshaft 48. The camshaft gear may be meshed with the crankshaft sprocket 22, but more commonly they are connected by a timing chain. In either case, the movement of the camshaft 48 and crankshaft 20 is synchronized. The camshaft gear is generally twice as large as the crankshaft sprocket 22 such that the crankshaft 20 will make two complete rotations for every one rotation of the camshaft 48. Thus, the valves are opened only once every two crankshaft revolutions An intake manifold 66 distributes a mixture of gasoline and air to each cylinder 18 via the intake valve opening 40. A carburetor 68 is mounted on top of intake manifold 66. The downward movement of the piston 28 within cylinder 18 produces a partial vacuum in the cylinder and tends to pull air through the carburetor 68 and intake manifold 66. As air moves through the carburetor 68, it picks up atomized particles of gasoline. The gas/air mixture is then pulled through the intake manifold 66 past an open intake valve 44 into cylinder 18. The ignition of the gas/air mixture in cylinder 18 drives the piston 28 downwardly within cylinder 18 which in turn rotates the crankshaft 20 as will be described in greater detail below. As the piston 28 moves upwardly within cylinder 18, the burned gases are forced past the exhaust valve 46 and through the exhaust manifold 70 which is also secured to cylinder heads 34.

The gas/air mixture within each cylinder 18 is ignited by a spark plug 72 screwed into a threaded opening formed in cylinder head 34. High voltage surges produced by an ignition coil are directed to the respective spark plugs 72 in proper firing order by a distributor 76. The distributor 76 includes a rotor mounted on top of a distributor shaft and a distributor cap 82 having a plurality of high tension terminals 84. The central high tension terminal 84 is connected by a high tension wire to an ignition coil. The outer terminals are connected by spark plug wires to respective spark plugs 72. As the rotor 78 turns, it connects in sequence the central high tension terminals to the various outer high tension terminals directing the high voltage surge from the coil to the various engine spark plugs 72.

It is appreciated that the timing of the spark must be synchronized with the movement of the valves and piston 28. Typically, this is done by meshing a gear on the distributor shaft with a gear on the camshaft 48 such that the distributor shaft is driven by the camshaft 48.

The manner of operation of such engines is well known to those skilled in the art, but is briefly described below. Such operation of the engine is divided into four cycles, which are called strokes. The first stroke is called the intake stroke. During this stroke, the piston 28 is moving downwardly within cylinder 18 and the intake valve 44 is open. The downward movement of the piston 28 creates a partial vacuum within cylinder 18 that pulls a gas/air mixture from the carburetor 68 past the open intake valve 44 into cylinder 18. As the piston 28 nears the bottom of its intake stroke, the intake valve 44 closes. The compression stroke begins with the piston 28 moving upwardly within cylinder 18 with both the intake valve 44 and exhaust valve 46 closed. The upward movement of the piston 28 compresses the gas/air mixture to approximately one-tenth of its original volume making it more combustible. As the piston 28 reaches the top of the compression stroke, a high voltage surge is directed from the ignition coil to the spark plug 72 by distributor 76. The resulting spark ignites the gas/air mixture within the cylinder. The heat of combustion causes forceful expansion of gases that push the piston 28 downwardly. The downward force is carried through the connecting rod 32 to the crankshaft 20 which is given a powerful turn. This is called the power stroke. As the piston 28 reaches the bottom of its power stroke, the exhaust valve 46 opens. The exhaust stroke begins with the upward movement of the piston 28 which forces the burned out gases past the exhaust valve 46 into the exhaust manifold 68.

The above description sets forth the basic mechanical components of a V-type engine. Additionally, the engine must include a fuel supply system, a cooling system, a lubricating system, and an ignition system. The components and operations of each of the above-mentioned systems are well known to those skilled in the art and are readily commercially available. Also, the engine would include an oil pan 26 mounted to the underside of the crank case 14, and a valve cover 38 mounted to each head 34.

Figure 4:
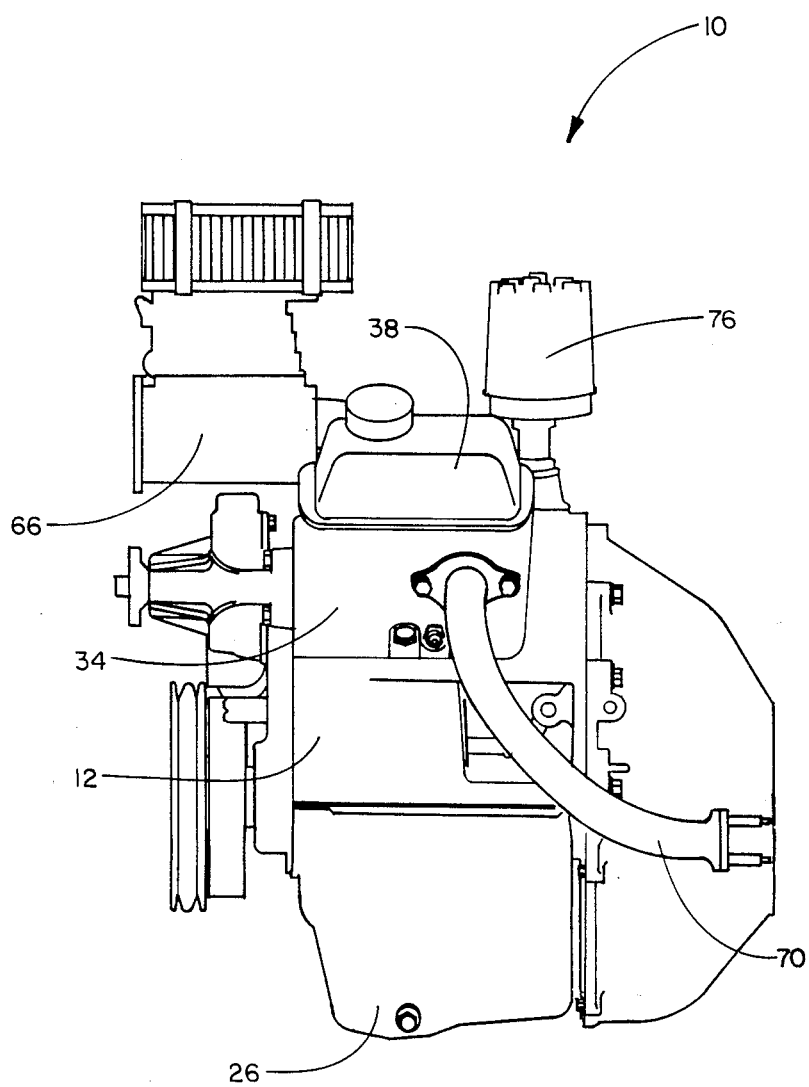
FIG. 4 is a side elevational view of the engine.
Figure 5:
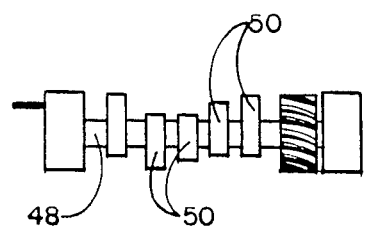
FIG. 5 is an elevation view of a camshaft used in connection with the engine.
Figure 6:
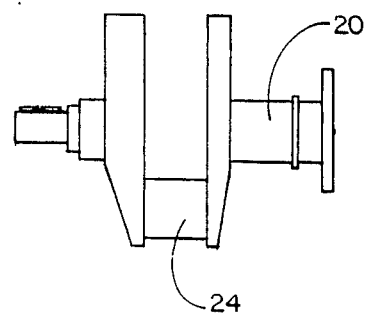
FIG. 6 is an elevation view of a crankshaft used in connection with the engine.
Figure 7:
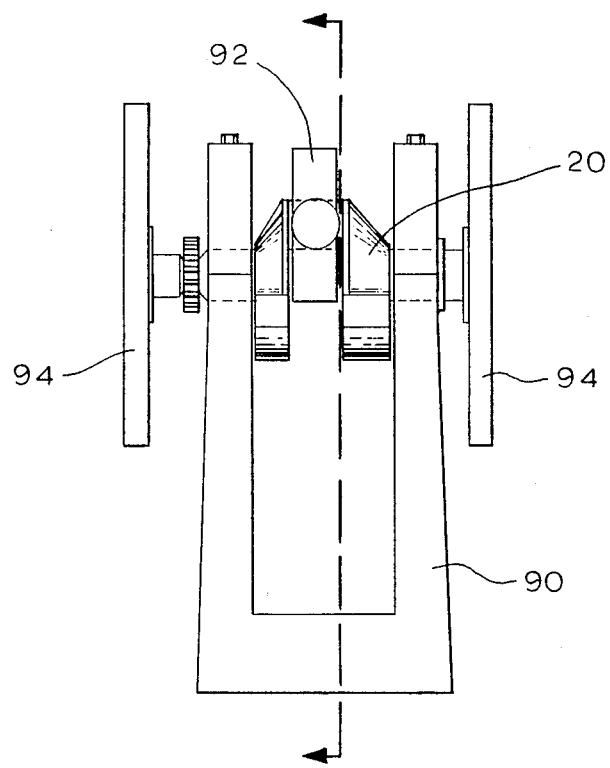
FIG. 7 is a front elevation of a balancing machine with a crankshaft mounted therein.
Figure 8:
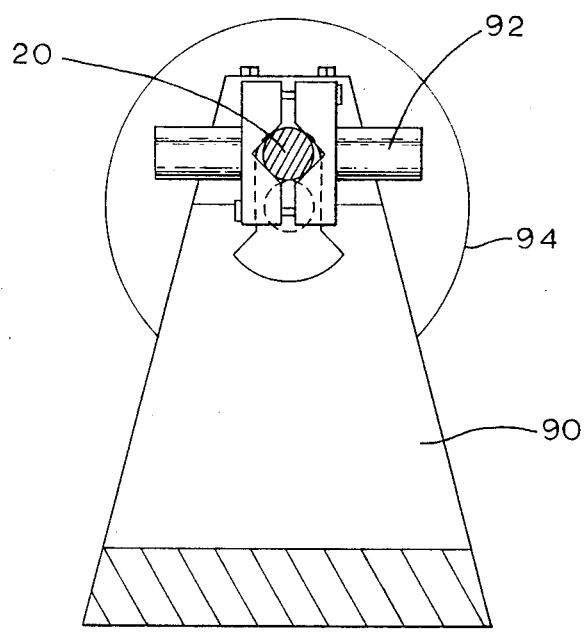
FIG. 8 is a cross-section of the balancing machine with a crankshaft mounted therein.

The block 12 of the present invention utilizes the bore dimension, pistons, rings, wristpins, connecting rods, and bearings of a 400 cubic Cheverolet V-8 engine and displaces 94 cubic inches. The crankshaft 20 shares an identical throw 24 with that of a standard V-8 Cheverolet crankshaft, but is much shorter. (FIG. 4) Similarly, the camshaft 48 requires only four lobes 50 as compared to a V-8 camshaft and its 16 lobes. (FIG. 3) The distributor 76 of the present invention is nothing more than a stock distributor for a V-8 engine having six of the eight outer terminals 84 removed.

The modified parts described above can be manufactured with existing molds, dies, and tooling with few modifications. One change in design, however, will have to be made for the V-2 engine to run smoothly or be vibration free. This change is in the balancing procedure normally used for a V-type engine crankshaft.

The V-8 engine is an even degree firing engine. In other words, one of the eight cylinders will fire every time the crankshaft 20 rotates ninety degrees. This even degree firing system allows the engine to run smoothly without vibration.

The example V-2 engine of the present invention, as discussed above, uses a single throw crankshaft 20 with a 90 degree cylinder spacing. This arrangement will cause an uneven degree firing of the cylinders. When cylinder No. 1 fires, the crankshaft will rotate 270 degrees before cylinder No. 2 fires. After cylinder No. 2 fires the crankshaft 20 will travel 450 degrees before cylinder No. 1 fires again. This uneven degree firing would normally cause the engine to run uneven or to vibrate. Thus, the crankshaft must be balanced to compensate for this uneven degree firing.

Rotating weight must be balanced in two planes. All of the parts that rotate in line with the crankshaft are balanced so that the weight of the parts are distributed equally around the center of rotation. This is called static balance. Since the crankshaft in most V-type engines is normally long, it must generally be checked to see that it is balanced from end to end. The crankshaft 20, of the present invention, receives only a dynamic balance. However, a fly wheel and harmonic balancer, which are mounted on opposite ends of the crankshaft 20 should themselves be statically balanced before being installed onto the crankshaft 20.

A balancing machine 90 is used to balance the rotating parts of the engine. Since V-type engines have their crankthrows 90 degrees apart from each other, weight has to be added to the throws during the balancing process to compensate for the 90 degree spacing. Weight is added in the form of bobweights 92, which are bolted to the crankshaft rod journal. In an even degree firing engine, the weight of the bobweight 92 is calculated by adding the total rotating weight of one crankthrow (which is the crankpin side of two connecting rods since the V-type engine has two rods per throw) and 50 percent of the reciprocating weight of one crankthrow. In other words, the weight of the rotating parts is added to one-half the weight of the reciprocating parts attached to each crankthrow. A typical bobweight calculation for a V-8 engine may be as follows:

| | |
|---|---|
| 700 g | rotating end of two connecting rods. |
| 800 g | total weight of 2 bearing inserts. |
| 880 g | total rotating weight of one crankthrow |
| 390 g | one piston |
| 125 g | pin |
| 80 g | one set of rings |
| 100 g | reciprocating end of one connecting rod. |
| 695 g | half of reciprocating weight of one crankthrow |
| 880 g | |
| 695 g | |
| 1575 g | bobweight |

Normally, the crankshaft is statically balanced prior to being dynamically balanced. The crankshaft 20 in accordance with the present invention, however, does not receive a static balance. Normally, this would cause the crankshaft to vibrate violently during the balancing procedure and probably endanger the operator of the balancing machine. To overcome this vibration in the balance procedure, two solid disks 94 are attached, one at each end, to the crankshaft prior to placing the entire assembly of crankshaft, bobweights 92, and attached disks 94 in the balancing machine 90. Each disk 94 has a radius exceeding that of the crankshaft throw, and together they have a total mass which exceeds that of the crankshaft and attached bobweights 92. The moment of inertia produced by the angular momentum of the irregularly shaped crankshaft is therefore moved beyond the radius of the crankshaft throw. The overall effect is to move the center of mass of the entire assembly closer to the axis of rotation.

Also, the weight of the bobweight 92 to be added during the balancing procedure must be calculated differently to compensate for the uneven degree firing of the cylinders.

After calculating the rotating weight and one-half the reciprocating weight of a crankthrow, a compensating factor is added which is equal to ten percent (10%) of the latter number. Thus, if one-half of the reciprocating weight is 695 grams calculated above, an additional 69.5 g is added to compensate for the uneven degree firing of the engine. The weight of the bobweight 92 for Applicant's engine would therefore be 1644.5 g (800 g + 695 g + 69.5 g). It should be noted that the weight of the bobweight 92 can also be calculated by adding one hundred percent (100%) of the rotating weight of one crankthrow and fifty-five percent (55%) of the reciprocating weight of one crankthrow as a shorthand method.

The complete V-2 engine constructed as described above is 21 inches long by 20 inches wide and 24 inches high. The complete engine weight, less starter and fluid is approximately 180 lbs. The engine will produce a maximum torque output of 110 ft.-lbs. at 3000 RPM, which is 62.8 horsepower. Thus, it can be seen that this engine is capable of doing the job of most four cylinder engines.

It can be readily seen that an engine which is produced by the procedures described in the present invention will have an inherent dynamic balancing of all the masses in the rotating assembly of the crank shaft and attached reciprocating parts. It can also be readily seen that the displacement volume of the individual cylinder bores is no longer restricted by the problem of adequately balancing the crankshaft and reciprocating mass assembly. Thus, it is possible to eliminate a number of cylinders necessary to produce an engine of a given displacement without resorting to costly, complicated, and energy robbing external vibration dampening devices.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A method for dynamically balancing a v-type engine having an uneven degree firing pattern and including a crankshaft having at least one crankthrow, and at least two piston assemblies, at least two connecting rods for connecting the piston assemblies to the crankthrow, the method comprising:
   (a) placing the crankshaft in a rotating balancing machine;
   (b) attaching a pair of statically balanced disks to opposite ends of the crankshaft, the radius of each disk being greater than the radius of the crankthrow and the combined mass of the two disks being greater than the mass of the crankshaft;
   (c) attaching bobweights to the crankthrow, the weight of the bobweights being equal to one-hundred percent of the rotating weight of the crank-/connecting rod/piston assembly plus fifty-five percent of the reciprocating weight of the crank-/connecting rod/piston assembly;
   (d) spinning the crankshaft and attached disks in the balancing machine to determine whether any dynamic imbalance exists; and
   (e) removing or adding weight to the crankshaft to offset the dynamic imbalance of the crankshaft.

* * * * *

UNITED STATES PATENT AND TRADEMARK OFFICE
CERTIFICATE OF CORRECTION

PATENT NO. : 4,874,449

DATED : October 17, 1989

INVENTOR(S) : Philipp Schaefer, et al.

It is certified that error appears in the above-identified patent and that said Letters Patent is hereby corrected as shown below:

Rewrite claim 33 as follows:

33. A process for forming a dressing on a substantially flat substrate having on at least one side a rough surface with fibers protruding therefrom, such as split leather or a textile material having on at least one side a split-leather-like appearance, the process comprising the steps of sequentially:

heating a support member having an upper side consisting of silicone rubber having antiadhesive properties and formed with small recesses for transmitting a pattern to said dressing;

applying a polyurethane-containing cross-linkable prepolymer onto the upper side of the heated support member for forming a layer of the polyurethane-containing cross-linkable prepolymer which, as a result of the heat of the support member, forms a cohesive solidified first layer of the dressing having a thickness between 0.07mm and 0.22mm;

further heating the support member from a bottom side thereof opposite the upper side of the support member at least until solidification of the first layer is complete;

applying an aqueous dispersion of synthetic plastics material onto the solidified first layer;

placing the substrate with its rough surface onto the second layer while the applied dispersion of synthetic plastics material of the second layer is still in a wet stage, whereby the fibers of the substrate are immersed in the wet second layer;

heating the support member from the bottom side

UNITED STATES PATENT AND TRADEMARK OFFICE
CERTIFICATE OF CORRECTION

PATENT NO. : 4,874,449

DATED : October 17, 1989

INVENTOR(S) : Philipp Schaefer, et al.

It is certified that error appears in the above-identified patent and that said Letters Patent is hereby corrected as shown below:

```
together with the solidified first layer, with the aqueous
dispersion, and with the substrate to a temperature of at least
85°C so the second dispersion solidifies to form a second layer
and applying a pressure onto the upper side of the substrate
opposite the rough surface by means of a laminar yielding
pressing element during a time interval of at least 10 seconds so
that vapor generated during the solidification of the second
layer is at least partially removed via the substrate; and
        removing from the support member the substrate pro-
vided with the dressing formed by the solidified first and second
layers.
```

Signed and Sealed this

Twentieth Day of November, 1990

Attest:

HARRY F. MANBECK, JR.

*Attesting Officer*   *Commissioner of Patents and Trademarks*